United States Patent
Nakatani et al.

(10) Patent No.: US 8,106,751 B2
(45) Date of Patent: Jan. 31, 2012

(54) VISUAL ABILITY IMPROVEMENT SUPPORTING DEVICE

(75) Inventors: Hiroto Nakatani, Nagoya (JP); Teiyuu Kimura, Nagoya (JP); Noriyuki Ozaki, Kariya (JP); Kenichi Mori, Suzuka (JP); Minoru Makiguchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 471 days.

(21) Appl. No.: 11/662,341

(22) PCT Filed: Dec. 15, 2005

(86) PCT No.: PCT/JP2005/023446
§ 371 (c)(1),
(2), (4) Date: Mar. 8, 2007

(87) PCT Pub. No.: WO2006/064968
PCT Pub. Date: Jun. 22, 2006

(65) Prior Publication Data
US 2008/0136609 A1    Jun. 12, 2008

(30) Foreign Application Priority Data
Dec. 17, 2004  (JP) ................................. 2004-366691

(51) Int. Cl.
*B60Q 1/00* (2006.01)
*G08G 1/09* (2006.01)
(52) U.S. Cl. ..................................... 340/425.5; 340/905
(58) Field of Classification Search ............... 340/425.5; 725/139
See application file for complete search history.

(56) References Cited

U.S. PATENT DOCUMENTS

| 4,185,266 | A  | * | 1/1980  | Nakashima ................... 340/461 |
| 5,034,732 | A  | * | 7/1991  | Iino .................................. 345/7 |
| 6,126,595 | A  |   | 10/2000 | Amano et al. |
| 6,179,453 | B1 |   | 1/2001  | McMahon |
| 6,429,789 | B1 | * | 8/2002  | Kiridena et al. ............... 340/905 |
| 6,864,927 | B1 | * | 3/2005  | Cathey .......................... 349/11 |

(Continued)

FOREIGN PATENT DOCUMENTS

JP    A-2000-71877    3/2000

(Continued)

OTHER PUBLICATIONS

Bellino, M. Lane detection algorithm for an onboard camera, 2004, Abstract and, FIG. 4, and section 1.1.2.*

(Continued)

*Primary Examiner* — Benjamin C Lee
*Assistant Examiner* — Cal Eustaquio
(74) *Attorney, Agent, or Firm* — Posz Law Group, PLC (57) ABSTRACT

A visual ability improvement device installed in a vehicle includes a noise generator, a surrounding situation detector, a driver status detector, a vehicle status detector, an operation switch, and a noise output device. A controller of the noise generator determines an optimum strength based on the surrounding situation from the surrounding situation detector, the driver's status from the driver status detector, the vehicle's status from the vehicle status detector, and the correspondence of the optimum representative noise to the above situation and statuses from the correspondence memory. Then the controller generates a noise with the determined the optimum representative noise strength, and outputs to the noise output device such as passenger compartment light a control signal which depends on the generated noise.

22 Claims, 3 Drawing Sheets

U.S. PATENT DOCUMENTS

| | | | |
|---|---|---|---|
| 6,890,304 | B1 | 5/2005 | Amano et al. |
| 7,274,287 | B2 * | 9/2007 | Dobler et al. ............... 340/425.5 |
| 7,423,524 | B2 * | 9/2008 | Mori et al. .................... 340/438 |
| 2002/0011925 | A1 * | 1/2002 | Hahn ........................ 340/425.5 |
| 2002/0171739 | A1 * | 11/2002 | Yamada ........................ 348/148 |
| 2003/0073406 | A1 * | 4/2003 | Benjamin et al. ............... 455/41 |
| 2003/0136600 | A1 * | 7/2003 | Breed et al. ................... 180/272 |
| 2003/0169213 | A1 * | 9/2003 | Spero ................................ 345/7 |
| 2003/0181822 | A1 * | 9/2003 | Victor ........................... 600/558 |
| 2004/0108971 | A1 * | 6/2004 | Waldern et al. ................... 345/8 |
| 2004/0252027 | A1 * | 12/2004 | Torkkola et al. ............. 340/576 |
| 2005/0222644 | A1 * | 10/2005 | Killian et al. ................... 607/57 |
| 2006/0017548 | A1 * | 1/2006 | Ozaki et al. ................ 340/425.5 |
| 2006/0020452 | A1 * | 1/2006 | Nakatani et al. ............. 704/226 |
| 2006/0080005 | A1 * | 4/2006 | Lee et al. ........................... 701/1 |
| 2006/0133649 | A1 | 6/2006 | Mori et al. |

FOREIGN PATENT DOCUMENTS

JP      A-2003-48453      2/2003

OTHER PUBLICATIONS

Mitaim, S. Adaptive Stochastic Resonance, Proceedings of the IEEE, vol. 86, No. 11, Nov. 1998.*

Bellino, M.; Lane Detection Algorithm for an Onboard Camera; 2004.*

Hidaka et al., *Functional stochastic resonance in the human brain: Noise induced sensitization of baroreflex system*, 15$^{th}$ Biological, Physiological Engineering Symposium Collection, BPES 2000 pp. 261-264, 2000 (Discussed on p. 2 of the spec.).

Office Action dated Oct. 31, 2008 in corresponding Chinese patent application No. 2005800392238 (and English translation).

* cited by examiner

VISUAL ABILITY IMPROVEMENT SUPPORTING DEVICE

TECHNICAL FIELD

The present invention relates to a visual ability improvement supporting device.

BACKGROUND ART

Conventionally a display device for a vehicle is described, for example in JP-2003-48453-A, which makes a driver of the vehicle recognize that the driver himself/herself is looking aside. This display device transparently displays on the front windshield of the vehicle an image flickering at a frequency corresponding to critical harmony frequencies of a portion of the retina of the driver's eye in the vicinity of the center of the retina by superimposing the flickering image.

The driver recognizes that the image is not flickering while the driver is looking forward, because the image is seen at the center of the driver's eyesight. On the other hand, the driver recognizes that the image is flickering while the driver is looking aside, because the image is seen at a peripheral portion of the driver's eyesight. Therefore, the flickering image makes the driver recognize that the driver is looking aside. Thus, the displaying device helps the driver always look forward.

However, in this case the driver tends not to look at directions other than the direction to the front. Therefore, the driver may fail to notice an object which is at a lateral side of the vehicle and has to be watched for safety of driving.

Besides, another display device of the vehicle is described, for example in JP-2000-71877-A, which provides the driver with a display of an image of a blind area at a place that corresponds well to an actual location of the blind area, which the driver cannot see.

Although this display device makes it possible for the driver to look at the image of the actual blind area, the display device does not induce the driver to look at the actual blind area.

It is an object of the present invention to improve visual ability of a driver to surrounding situations of a vehicle and making the driver attentive to the surrounding situations.

DISCLOSURE OF THE INVENTION

A visual ability improvement supporting device generates a visual noise and delivers the visual noise to a driver of the vehicle. The visual noise has a subthreshold noise strength which is close to and smaller than a threshold strength, above the threshold strength a light can be recognized by a human and below the threshold strength a light cannot be recognized by a human.

The present invention is based on the research described in "Functional stochastic resonance in the human brain: Noise induced sensitization of baroreflex system", Hidaka, et al., proceedings of Bionics and Physiology Engineering Symposium, Vol. 15, p. 261-264.

The stochastic resonance in a living body is a phenomenon in which an input of proper noise to a sensory nerve cell enhances its sensitivity to an input signal lower than a normal threshold. It is experimentally shown that the stochastic resonance in a living body enhances vital functions of a human such as perception, regulation and action.

Figure 3A:
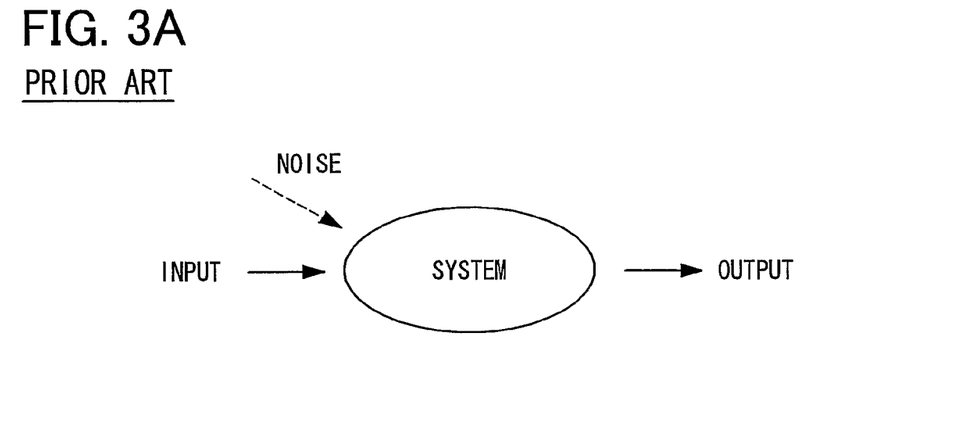
FIG. 3A shows a schematic diagram of a sensory nerve cell as a nonlinear system.
Figure 3B:
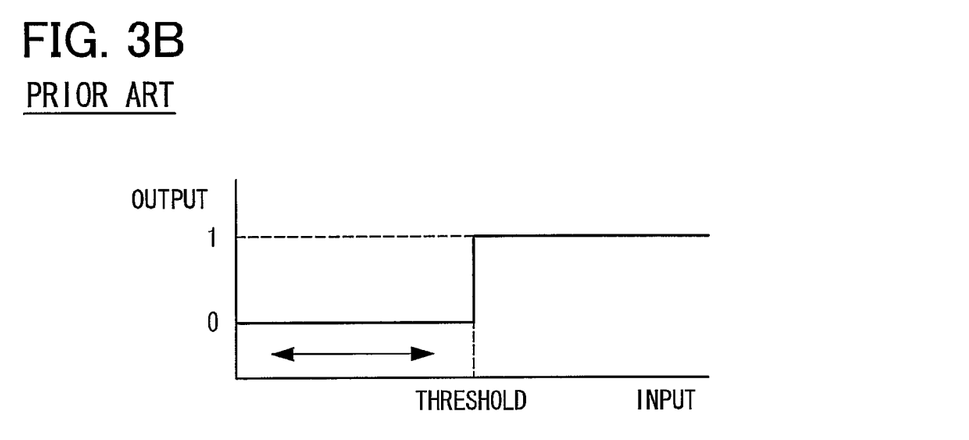
FIG. 3B shows threshold type input/output characteristics of the system.
Figure 3C:
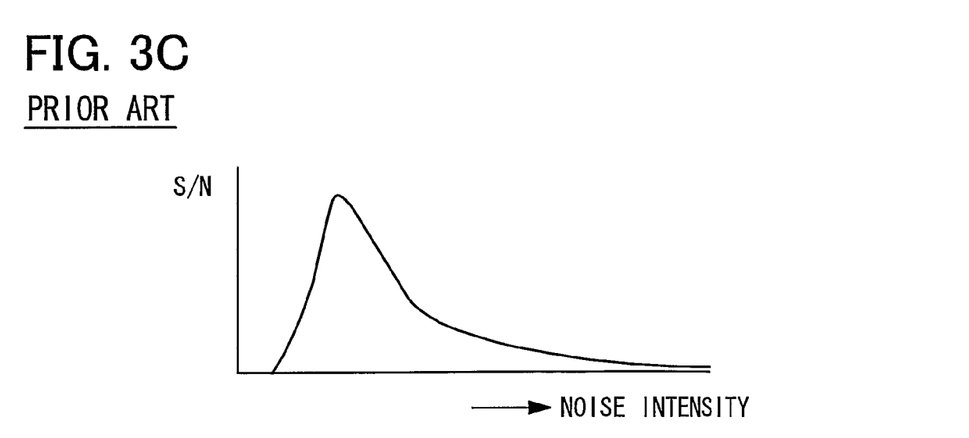
FIG. 3C shows a S/N-noise strength of the system.

Hereafter, the stochastic resonance is described with reference to FIGS. 3A-3C. FIG. 3A shows a schematic diagram of a sensory nerve cell as a nonlinear system. FIG. 3B shows threshold type input/output characteristics of the system. FIG. 3C shows an output S/N of the system relative to input noise strength.

As seen in FIG. 3B, the system generally does not respond to an input signal with strength below a threshold because it has threshold type input/output characteristics. However, if wideband noise is inputted to the system, it responds to some input signals lower than the threshold.

In addition, as shown in FIG. 3C, if the wideband noise is too faint or too intensive compared to a threshold irrespective of the strength of the input signal, the noise decreases the signal-to-noise ratio (S/N) of output signals from the system. With moderate noise strength the signal-to-noise ratio becomes larger and with the optimum strength it becomes at its maximum.

The visual ability improvement supporting device includes a controller for controlling a characteristic of the delivering of a visual noise based on the detection of at least one of a surrounding situation detector for detecting a situation surrounding the vehicle and a driver status detector for detecting a status of the driver.

The situation surrounding the vehicle varies according to, for example, movements of the vehicle or the weather around the vehicle. The visual ability improvement supporting device delivers the visual noise suitable for the situation surrounding the vehicle to the driver by controlling the characteristic of delivering the visual noise based on the detected situation.

Even if the situation surrounding the vehicle does not change, the visual ability improvement supporting device delivers the visual noise suitable for the status of the driver to the driver by controlling the characteristic of delivering the visual noise based on the detected status. By delivering the suitable visual noise to the driver, the visual ability of the driver in recognizing an object is improved properly.

BEST MODE FOR CARRYING OUT THE INVENTION

Figure 1A:
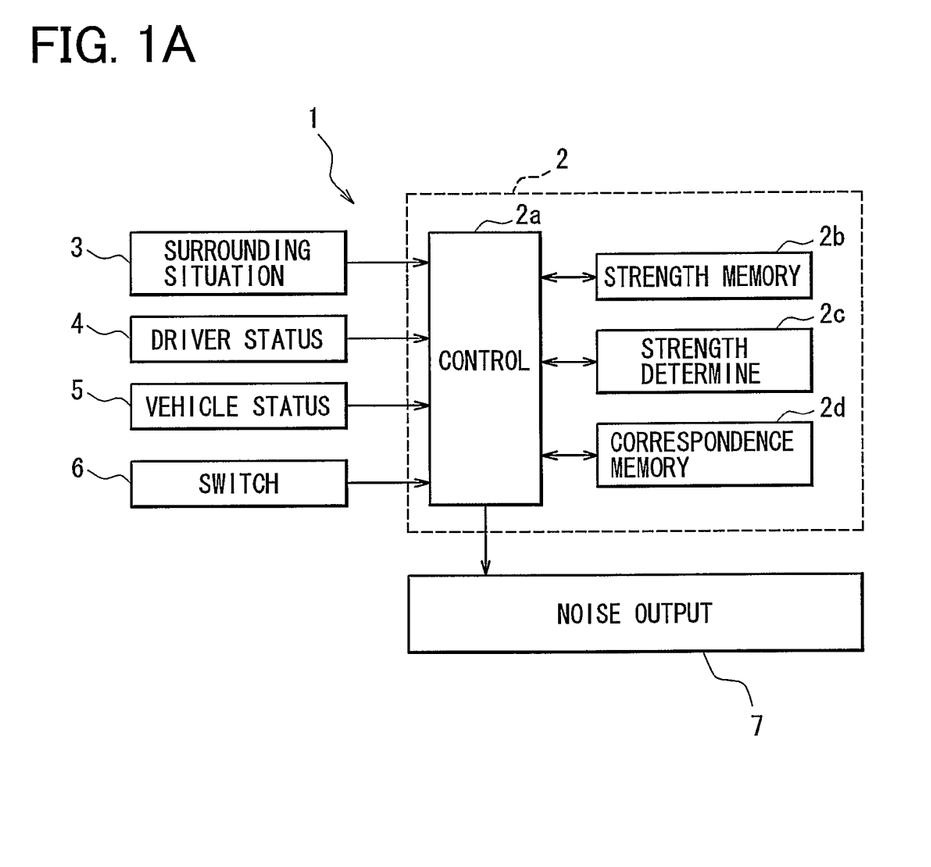
FIG. 1A is a block diagram showing a visual ability improvement device according to an embodiment of the present invention.

As shown in FIG. 1A, a visual ability improvement device 1 according to an embodiment is installed in a vehicle and includes a noise generator 2, a surrounding situation detector 3, a driver status detector 4, a vehicle status detector 5, an operation switch 6, and a noise output device 7.

The noise generator 2 includes a controller 2a, a noise strength memory 2b, an optimum strength determination device 2c, and a correspondence memory 2d.

The noise strength memory 2b stores threshold strength of visual stimulation to human's eyes. The human can recognize a light (i.e., the visual stimulation) if the light has strength higher than the threshold strength, and cannot recognize the light if the light has strength lower than the threshold strength. Each of hue, brightness, and saturation can be regarded as the strength of the visual stimulation. For example, a human sometimes can recognize a light and sometimes cannot recognize the light depending on the hue of the light, even if its brightness and the saturation of the light are unchanged.

The optimum strength determination device $2c$ determines optimum representative strength of a visual noise to be output based on the strength threshold stored in the noise strength memory $2b$. The visual noise is a light the strength of which varies randomly or nearly randomly. The representative strength can be average strength, maximum strength, total strength over the entire frequency range or etc., which represent strength of the visual noise.

The correspondence memory $2d$ stores data regarding correspondence of optimum strength to a situation surrounding the vehicle, a status of the driver, and a status of the vehicle, which are detected by the surrounding situation detector 3, the driver status detector 4, and the vehicle status detector 5, respectively. The optimum strength is set to be smaller than and close to a threshold strength of human's visibility, wherein a human can recognize a light with strength higher than the threshold strength and cannot recognize a light with strength lower than the threshold strength.

The controller $2a$ is connected with the noise strength memory $2b$, the optimum strength determination device $2c$, and the correspondence memory $2d$.

The controller $2a$ is also connected with the surrounding situation detector 3, the driver status detector 4, and the vehicle status detector 5. The controller $2a$ determines the optimum strength of visual noise based on the surrounding situation from the surrounding situation detector 3, the drivers status from the driver status detector 4, the vehicle's status from the vehicle status detector 5, and the correspondence stored in the correspondence memory $2d$. The visual noise is a light the strength of which varies randomly or nearly randomly.

Then the controller $2a$ generates noise based on the determined optimum strength, and outputs to the noise output device 7 a control signal (a driving signal) which depends on the generated noise, in order to make the noise output device 7 deliver the visual noise having representative strength which equals the determined optimum strength. The representative strength of the visual noise can be average strength, maximum strength, total strength over the entire frequency range or etc, which represent strength of the visual noise.

Figure 1B:
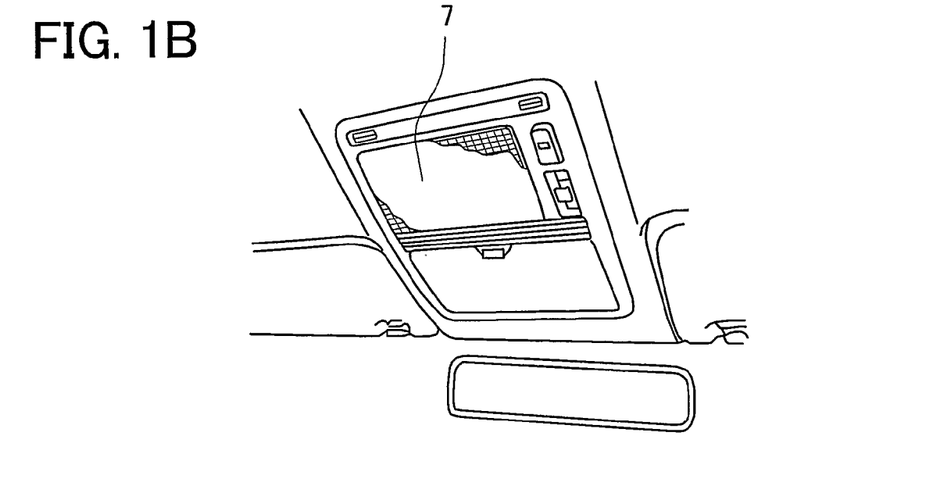
FIG. 1B is a schematic view showing a noise generator in the visual ability improvement device.

The noise output device 7 outputs the visual noise according to the control signal from the noise generator 2 to deliver the visual noise to the driver's eye. The noise output device 7 includes, for example, a lighting device in the passenger compartment of the vehicle as shown in FIG. 1B. A light with the visual noise is outputted from the lighting device. The noise output device 7 is required to output a light with brightness higher than that of the visual noise in order to function as a normal room lighting device. The noise output device 7 is installed, for example, at a position which is at the bottom of the ceiling of the passenger compartment and is in front of the driver's head. At this position the driver can see the light emitted from the noise output device 7 easily.

The visual noise is preferably wideband noise which does not have extremely high strength at any frequency range in order to induce stochastic resonance (SR) in visual recognition of the driver. For example, random noise having constant representative strength at the visible band and 1/f noise having representative strength inversely proportional to the frequency can be used to induce the stochastic resonance.

The random wideband noise decreases the signal-to-noise ratio (S/N) of output signals from a nonlinear system, if the strength of the noise is too large or too small compared to the threshold strength. With moderate representative strength smaller than or close to the threshold strength, the signal-to-noise ratio becomes larger. With the optimum strength, the signal-to-noise ratio becomes at its maximum.

To output the visual noise with suitable representative strength for inducing the stochastic resonance, the optimum strength can be predetermined as a suitable representative strength for inducing the stochastic resonance, for example, by experiments and then stored in the noise strength memory $2b$.

In order to compensate differences of sensitivity among individuals, the noise generator 2 may determine the optimum noise strength as follows. First, the controller $2a$ increases the strength of light from the noise output device 7 gradually until the driver recognize the light for the first time. When the driver recognizes the light and subsequently operates the operation switch 6, the controller $2a$ detects the operation and makes the noise strength memory $2b$ store the current light strength as the threshold strength. Then the controller $2a$ determines the optimum strength which increases the signal-to-noise ratio and makes the noise strength memory $2b$ store the determined optimum strength.

The optimum strength may be determined to be about 100% of the threshold strength in the case that the random noise is to be output from the noise output device 7, or about 69% of the threshold strength in the case that the 1/f noise is output. The ratio of the optimum strength to the threshold strength may be calculated beforehand by experiments. The ratio of the optimum strength to the threshold strength may be changed.

In the visual ability improvement device 1 described above, the controller $2a$ can control characteristics of delivering the visual noise based on at least one of the surrounding situation from the surrounding situation detector 3 and the driver's status from the driver status detector 4.

The situation surrounding the vehicle varies according to, for example, movements of the vehicle or the weather. The visual ability improvement supporting device 1 may deliver the visual noise suitable for the situation surrounding the vehicle to the driver by controlling the characteristics of delivering the visual noise based on the surrounding situation.

Even if the surrounding situation does not change, the visual ability improvement supporting device 1 is may deliver the visual noise suitable for the status of the driver to the driver by controlling the characteristics of delivering the visual noise based on the driver's status. By delivering the suitable visual noise to the driver, the visual ability of the driver in recognizing an object is improved properly.

The characteristics of delivering the visual noise include, for example, the brightness, the hue, the saturation, and a lighting period in which the noise output device 7 keeps outputting the visual noise. By controlling the lighting period, the noise output device 7 can control a blink interval at which the noise output device 7 repeats starting and stopping of the output of the visual noise alternately.

Hereafter the operations of the controller $2a$, surrounding situation detector 3, and driver status detector 4 are described in detail.

(1) Examples of Operations of Surrounding Situation Detector 3 and the Controller $2a$:

(1-1) Operations Based on Illuminance Around the Vehicle:

In this case, an illuminance sensor is used as the surrounding situation detector 3 to detect the illuminance around the vehicle. The correspondence memory 2d memorizes one-to-one correspondence between the illuminance around the vehicle and the optimum strength. The controller 2a obtains the illuminance around the vehicle from the illuminance sensor and generates, based on the correspondence in the correspondence memory 2d, a noise which is set to have the optimum representative strength wihich is suitable for the obtained illuminance. Then, the controller 2a outputs to the noise output device 7 the control signal (the driving signal) which depends on the generated noise.

The illuminance around the vehicle varies depending on whether it is daytime or night, and whether the vehicle is in a tunnel or out of the tunnel in the daytime. The controller 2a controls the characteristics of the visual noise in order to maintain an optimum contrast between the light surrounding the vehicle and the visual noise to be delivered. The correspondence between the illuminance and the optimum strength can be determined beforehand by experiments. The experiments can be made, for example, with multiple examinees by changing the illuminance around the vehicle in which each of the examinees is in, by determining the optimum strength for each of the examinees, and analyzing the determined values statistically to obtain the correspondence.

The controller 2a makes the noise output device 7 deliver the visual noise with its hue changing as the strength of the visual noise when the detected illuminance is higher than a predetermined illuminance and deliver the visual noise with its brightness changing as the strength of the visual noise when the detected illuminance is lower than a predetermined illuminance. The operation of the controller 2a is designed based on the concept that human's eyes hardly recognize the change of the hue in the dark.

Alternatively, the controller 2a may make the noise output device 7 deliver the visual noise with its hue and/or brightness changing as the strength of the visual noise within a first range when the detected illuminance is higher than a predetermined illuminance and deliver the visual noise with its hue and/or brightness changing as the strength of the visual noise within a second range wider than the first range. The operation of the controller 2a is designed based on the concept that resolution of human's eyes to the hue and the brightness becomes lower in the dark than in the light.

The characteristics of the human's eyes come from a fact as follows. A retina of a human includes pyramidal cells and rod cells. The pyramidal cells sense color, work in bright circumstances, have low sensitivity, have high resolution, and are dominant in number near the center of the retina. On the other hand, the rod cells sense brightness, work in dark circumstances, have high sensitivity, have low resolution, and are dominant in number near the periphery of the retina.

(1-2) Operations Based on a Position of an Object Around the Vehicle:

In this case, a millimeter wave radar, a laser radar, or an image sensor are used as the surrounding situation detector 3 to detect the position of the object (such as another vehicle, a passenger, or an obstacle at a lateral edge of a road) around the vehicle. The controller 2a makes the noise output device 7 deliver the visual noise to the driver along a direction to the detected position as seen from the driver. It is supposed that, as shown in FIG. 1B, the noise output device 7 is installed at the position which is at the bottom of the ceiling of the passenger compartment and is in front of the driver's head. In this case, the noise output device 7 can be designed so that the direction of the outputting of the visual noise can be controlled. In addition, the controller 2a controls the noise output device 7 so that the noise output device 7 delivers the visual noise to the driver along the direction to the detected position as seen from the driver.

For example, when the object is in front of the vehicle, the controller 2a makes the noise output device 7 output the visual noise to the front. Moreover for example, when the object is located to the left of the vehicle, the controller 2a makes the noise output device 7 output the visual noise to the left. Alternatively, lighting devices as the noise output device 7 may be installed in several upper portions of the instrument panel of the vehicle, and the controller 2a makes one of the lighting devices in the direction to the object as seen from the driver output the visual light.

The laser radar used as the surrounding situation detector 3, has a transmitter (not shown) transmitting a laser light, a receiver receiving the laser light (not shown) reflected by the object. In addition, the laser radar can detect the position of the object (or an outline shape of the object) based on the transmitted laser light and the received laser light.

(1-3) Operations Based on a Deviation of the Vehicle from a Center of a Lane in which the Vehicle is Running:

In this case, an image sensor or the like is used as the surrounding situation detector 3. The image sensor takes an image of a surface of a road in front of the vehicle, and recognizes, based on the taken image, lane marks painted on the left and the right of the road in front of the vehicle in a well-known method. Then the surrounding situation detector 3 obtains positional data of the lane marks in a reference frame fixed to the vehicle. The controller 2a detects the deviation along the width direction of the lane based on positional relation between the recognized lane marks and the vehicle, and controls the noise output device 7 so that the visual noise is delivered along the direction of the deviation.

For example, if the vehicle is at the center of the lane or near the center of the lane, the controller 2a does not make the noise output device 7 blink. In this case, the controller 2a may make the noise output device 7 output a green light.

Figure 2A:
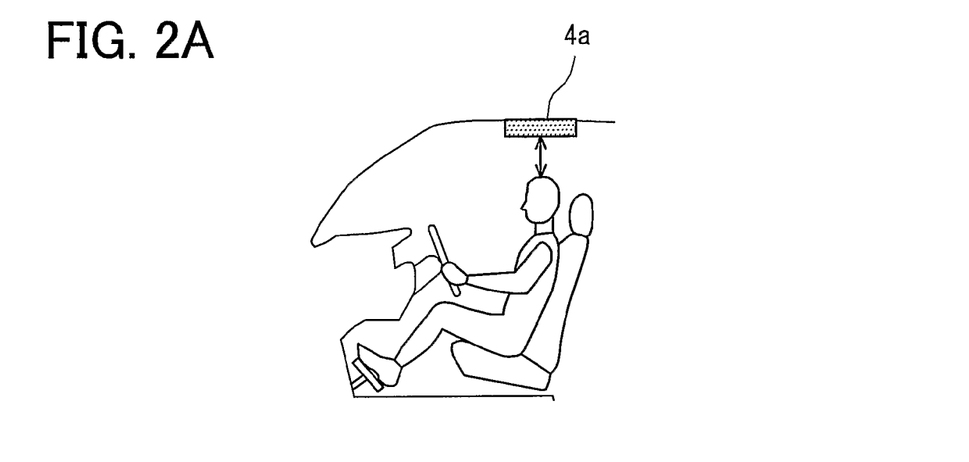
FIGS. 2A and 2B are schematic views showing a location of a head distance sensor in the visual ability improvement device.
Figure 2B:
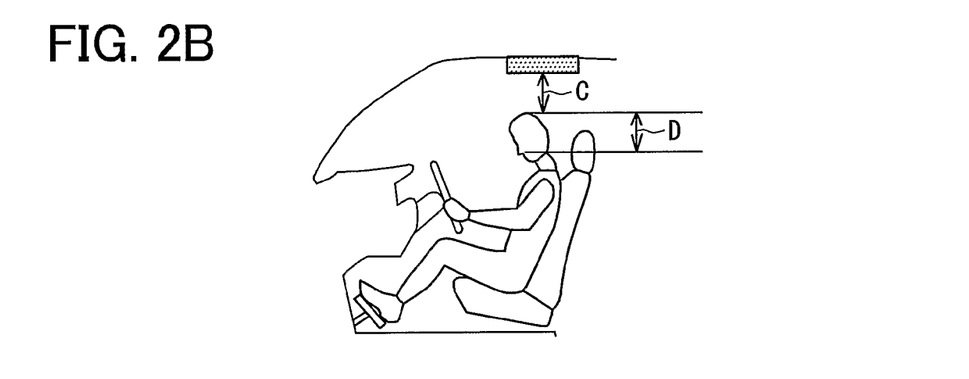
Figure 2C:
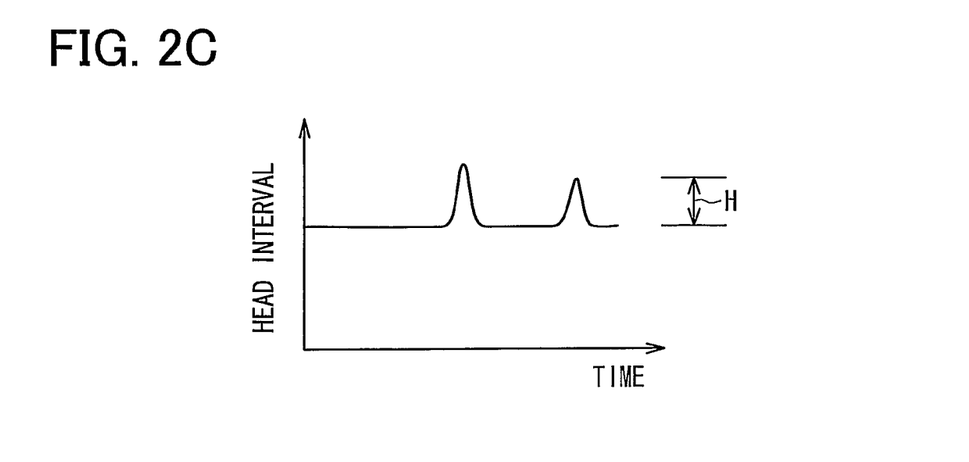
FIG. 2C is a graph showing change of an interval between a head of a human and the head distance sensor.

On the other hand, if the vehicle deviates to the left from the center, the controller 2a makes the noise output device 7 deliver the visual noise to the driver from the left. In the case that the noise output device 7 is installed as shown in FIGS. 2A, 2B and 2C, the controller 2a makes the noise output device 7 output the visual noise to the left. If the vehicle deviates to the right from the center, the controller 2a makes the noise output device 7 deliver the visual noise to the driver from the right. Thus, by promoting awareness of the driver to the direction of the deviation, the driver notices the deviation earlier and operates the vehicle to return to the center of the lane.

(1-4) Operations Based on Navigational Information:

In this case, a navigation device is used as the surrounding situation detector 3 to obtain at least one of a shape of a road in front of the vehicle, a status of traffic jam in the road, the number of intersections in the road, and a type of the road. The controller 2a determines a direction on which the driver's attention should be put, and controls the noise output device 7 so that the visual noise is delivered to the driver along the determined direction.

For example, if the obtained information on the shape of the road indicates that the road in front of the vehicle curves to the left, the controller 2a makes the noise output device 7 deliver the visual noise to the driver from the left. On the other hand, if the obtained information on the shape of the road indicates that the road in front of the vehicle curves to the right, the controller 2a makes the noise output device 7 deliver the visual noise to the driver from the right.

If the obtained information on the status of the traffic jam indicates that the road which the vehicle is approaching is in a traffic jam, the controller 2a makes the noise output device 7 deliver the visual noise to the driver from the front.

If the obtained information based on the current position of the vehicle and the map data of the navigation device indicates that the vehicle is traveling on a road with a small amount of intersections or that the vehicle is traveling on a highway, the controller 2a makes the noise output device 7 deliver the visual noise to the driver from the front. On the other hand, if the obtained information indicates that the vehicle is running on a road with a large amount of intersections, the controller 2a makes the noise output device 7 deliver the visual noise to the driver from the left and the right as well as from the front.

(1-5) Operations Based on Weather Around the Vehicle:

In this case, an illuminance sensor or a rain drop sensor is used as the surrounding situation detector 3 to detect the weather (i.e. fine, cloudy, or rainy). The correspondence memory 2d memorizes one-to-one correspondence between the weather around the vehicle and the optimum strength. The controller 2a obtains the weather around the vehicle from the surrounding situation detector 3 and makes, based on the correspondence in the correspondence memory 2d, the noise output device 7 deliver the visual noise corresponding to the detected weather. For example, if it is fine, the controller 2a makes the noise output device 7 deliver the visual noise having increased brightness with the hue being changed as the strength of the visual noise to be delivered. On the other hand, if it is cloudy or rainy, the controller 2a makes the noise output device 7 deliver the visual noise having decreased brightness with the brightness being changed as the strength of the visual noise to be delivered.

(2) Examples of Operations of Driver Status Detector 4 and the Controller 2a:

(2-1) Operations Based on a Position of the Head of the Driver:

In this case, a head position sensor 4a shown in FIG. 2A is used as the driver status detector 4 to detect an interval (hereafter head interval) between the ceiling of the passenger compartment and the head of the driver. The head position sensor 4a is located on a position at the bottom of the ceiling just above the head of the driver seating on a driver's seat of the vehicle. The head position sensor 4a transmits, for example, an infrared light and calculates the head interval based on a time interval between the transmission and a reception of the infrared light. The correspondence memory 2d memorizes one-to-one correspondence between the head interval around the vehicle and the optimum strength. The controller 2a obtains the head interval from the head position sensor 4a and makes, based on the correspondence in the correspondence memory 2d, the noise output device 7 deliver the visual noise having the representative strength equaling the optimum strength suitable for the obtained head interval. For example, the controller 2a makes the noise output device 7 deliver the visual noise with its brightness being higher as the detected head interval is larger.

Thus, in the case that the noise output device 7 is located above the head of the driver as shown in FIG. 1B, the visual ability improvement device 1 can deliver the visual noise suitable for physical size (specifically sitting height) of the driver, because the head interval depends on the physical size of the driver.

(2-2) Operations Based on Movement of the Head of the Driver:

In this case, a head position sensor 4a shown in FIG. 2A is used as the driver status detector 4 to detect the head interval and determine based on the detection whether the driver is likely to be dozing. Specifically, as shown in FIGS. 2B and 2C, the controller 2a determines that the driver is likely to be dozing when a difference H between the head interval detected at the time of the determination and a head interval (hereafter reference head interval C) detected at the time of starting the vehicle is larger than an average head size D. The operation of the determination is designed based on the fact that the head distance changes by the average head size D when the driver is about to sleep and becomes piddle-noodle. The controller 2a may determine that the driver is likely to be dozing when the change H of the head interval from the reference head interval C exceeds the average head size D twice or more. The reference head interval C can be defined to be an average of the head distance during the driving of the vehicle.

When the controller 2a determines that the driver is likely to be dozing, the controller 2a controls the noise output device 7 so that at least one of the strength and the brightness of the visual noise to be delivered becomes larger. The operation of the controller 2a is based on the concept that the driver becomes less sensitive when the driver is dozing.

Since it is important to stop the driver's dozing, the controller 2a may give an external stimulation to the dozing driver by means of an external stimulating device (not shown) which is included in the visual ability improvement device 1 and is capable of giving the external stimulation for waking the driver up. An air conditioner, a lighting device in a meter, a mechanism for giving a vibration to the driver's seat, or an audio device can be the external stimulating device. By increasing the amount of air from the air conditioner, increasing brightness of the lighting device, giving the driver's seat the vibration, or increasing sound volume of the audio device, the stimulation is given to at least one of five senses of the driver who is less sensitive to the external stimulation than usual.

(2-3) Operations Based on Heartbeats of the Driver:

In this case, a heartbeat sensor is used as the driver status detector 4 to detect the heartbeats of the driver and estimates a degree of arousal (i.e. an arousal level) of the driver based on the detected heartbeats. The heartbeat sensor may be a wrist watch type and detect the heartbeats based on blood pressure measured at radial artery of the driver. In addition, the heartbeat sensor may be incorporated in the steering wheel and detect the heartbeats based on blood pressure measured at a palm of the driver. Moreover, the heartbeat sensor can be located on the driver's seat.

The heartbeat sensor of the wrist watch type is described in U.S. Pat. No. 6,890,304 or U.S. Pat. No. 6,126,595 (JP-H8-299443-A). This heartbeat sensor measures pulse waves with a pressure sensor in the watch being pressed on the radial artery, and uses several kinds of measured quantities for estimating the arousal level of the driver's body.

Some of the kinds of the measured quantities are, for example, an RR interval and an HF (High Frequency) component. The RR interval is a time interval between an R-wave of a certain heartbeat and another R-wave of another heartbeat coming next to the certain heartbeat, and is a value indicating an autonomic nervous function of a human. It is known from analyses of a cardiac electrogram that the RR interval varies over time. Variations of the blood pressure measured at the radial artery is defined to be variations of systolic arterial pressure and diastolic blood pressure per a pulse, and therefore correspond to the variation of the RR interval. The systolic arterial pressure and the diastolic blood pressure per a pulse are measured as the maximum value of arterial blood pressure and a local minimal value adjacent to the maximum value in each RR interval. Spectrum analyses of the variation of the heartbeats or the variation of the blood pressure make it apparent that each variation is composed of multiple waves. Among the multiple waves, a variation synchronizing with breathing is the HF component.

When the controller 2a determines that the degree of arousal of the driver is decreasing, the controller 2a controls the noise output device 7 so that at least one of the strength and the brightness of the visual noise to be delivered becomes larger. The operation of the controller 2a is based on the concept that the driver becomes less sensitive when the driver is dozing.

Since it is important, as described in (2-2), to stop the driver's dozing, the controller 2a may give an external stimulation to the dozing driver by means of the external stimulating device (not shown).

(2-4) Operations Based on a Line of Sight:

In this case, a line-of-sight sensor is used as the driver status detector 4 to detect a direction of the line of sight. The controller 2a obtains the direction of the line of sight from the driver status detector 4 and makes the noise output device 7 output the visual noise to the obtained direction, based on movement of a target point of the line of the sight from a close object to a distant object.

For example, when the line of sight turns upward, the controller 2a makes the noise output device 7 output the visual noise to the obtained direction. The operation of the controller 2a is based on the concept that it becomes hard to see the target point when the target moves from a close position to a distant position. Such a situation occurs, for example, when the driver looks at an object in front of the vehicle just after looking at a meter in the vehicle. By outputting in this situation the visual noise to the target of the line of sight, the visual noise is delivered to the driver along the direction of the line of sight. Thus, the ability of visual recognition of the driver is improved.

In addition, the controller 2a may control the noise output device 7 based on the line of sight of the driver as follows. The controller 2a causes the visual noise device to deliver, from directions within a central vision of the driver, the visual noise with the hue mainly changing and to deliver, from directions within a peripheral vision of the driver, the visual noise with the brightness of the visual noise mainly changing.

This operation of the controller 2a is based on the concept that the pyramidal cells sensing the color are dominant in number near the center of the retina and that the rod cells sensing the brightness are dominant in number near the periphery of the retina. Therefore, it is better that the noise output device 7 delivers, from directions within the central vision, the visual noise with the hue mainly changing and delivers, from directions within the peripheral vision, the visual noise with the brightness of the visual noise mainly changing.

The present invention should not be limited to the embodiment discussed above and shown in the figures, but may be implemented in various ways without departing from the spirit of the invention, as described below.

(1) The noise output device 7 may be a lighting device attached to a location in the passenger compartment different from the location of the noise output device 7 shown in FIG. 1B. The noise output device 7 may be dedicated for outputting the visual noise. In delivering the visual noise to the driver from the front, a head-up display (HUD) or a rearview mirror can be effectively used as the noise output device 7. In delivering the visual noise to the driver from the lateral directions, a door mirrors can be effectively used as the noise output device 7.

In using the HUD as the noise output device 7, it is possible to control brightness, hue, and schedules for displaying of a screen displayed by the HUD. In using the rearview mirror and the door mirrors, the controller 2a may make the mirrors vibrate to deliver the visual noise from the mirrors. In addition, the controller 2a may make a display screen in the mirror output the visual noise while controlling brightness, hue, schedules for displaying of the screen.

(2) The controller 2a may be capable of detecting a following vehicle at the rear of the vehicle by means of the image sensor and may cause a transparent liquid crystal display on the surface of a mirror to deliver the visual noise when the following vehicle is detected.

(3) The controller 2a may control characteristics of delivering the visual noise based on the status of the vehicle, as well as the surrounding situation and the status of the driver. For example, it is possible that the vehicle status detector 5 detects information such as velocity of the vehicle or rotation angle of the steering of the vehicle, and the controller 2a adjusts the characteristics of the delivering of the visual noise based on the detected information. Thus, the visual ability improvement device 1 can change the characteristics of the delivering of the visual noise based on the surrounding situation and the drivers status, and corrects the characteristics based on the status of the vehicle.

For example, the visual ability improvement device 1 may output the visual noise to a smaller region when the detected velocity of the vehicle is higher, and output the visual noise to a larger region when the detected velocity of the vehicle is low or the vehicle is traveling in an urban area. For example, if the vehicle is traveling at nearly 100 km/h, the region to which the visual noise is output can be designed to match a width of the road on which the vehicle is traveling, because it is likely that the vehicle is traveling a highway without an intersection. On the other hand, if the vehicle is traveling at a low speed, the region to which the visual noise is output can be designed to match the maximum eyesight of a human, which includes 160 degrees in the horizontal surface and thus includes the front and the lateral directions.

In addition, the vehicle status detector 5 may detect a heading direction of the vehicle based on the detected rotation angle of the steering and adjust the characteristics according to the detected direction. For example, if the vehicle is traveling in a straight line, the visual noise is delivered to the driver from the front. If the vehicle is turning to the left or right, the visual noise is delivered from the left or the right, respectively.

The invention claimed is:

1. A visual ability improvement supporting device for a vehicle, comprising:
   a visual noise device including a lighting device provided in a passenger compartment of the vehicle for outputting light, the visual noise device generating a visual noise and delivering the visual noise to a driver of the vehicle so that the visual noise has a subthreshold noise strength which is close to and smaller than a threshold strength, wherein above the threshold strength a light can be recognized and below the threshold strength a light cannot be recognized, and wherein the visual noise is determined to induce stochastic resonance in visual recognition of the driver and is superimposed on the visible light outputted from the lighting device;
   a surrounding situation detector for detecting a situation surrounding the vehicle; and
   a controller for controlling a characteristic of delivering of the visual noise based on the detected situation, wherein the visual noise is random noise, wherein the lighting device is configured to provide the visual noise in one of a plurality of directions;

wherein the surrounding situation detector detects a position of an object around the vehicle and determines in which of the plurality of directions the position of the object is with respect to the driver; and wherein the controller causes the visual noise device to deliver the visual noise to the driver along the determined direction of the object with respect to the driver.

2. The visual ability improvement supporting device according to claim 1, further comprising a storage device storing a correspondence of illuminance and optimum strength, wherein:

the surrounding situation detector detects the illuminance around the vehicle; and the controller sets based on the stored correspondence the noise strength corresponding to the detected illuminance.

3. The visual ability improvement supporting device according to claim 1, wherein:

the surrounding situation detector detects illuminance around the vehicle; and the controller causes, in a case that the detected illuminance is higher than a predetermined illuminance, the visual noise device to deliver the visual noise with hue of the visual noise changing; and the controller causes, in a case that the detected illuminance is lower than the predetermined illuminance, the visual noise device to deliver the visual noise with brightness of the visual noise changing.

4. The visual ability improvement supporting device according to claim 1, wherein:

the surrounding situation detector detects illuminance around the vehicle;

the controller causes, in a case that the detected illuminance is higher than a predetermined illuminance, the visual noise device to deliver the visual noise with one of hue and brightness of the visual noise changing within a first range; and the controller causes, in a case that the detected illuminance is lower than the predetermined illuminance, the visual noise device to deliver the visual noise with the one of the hue and the brightness of the visual noise changing within a second range wider than the first range.

5. A visual ability improvement supporting device for a vehicle, comprising:

a visual noise device including a lighting device provided in a passenger compartment of the vehicle for outputting light, the visual noise device generating a visual noise and delivering the visual noise to a driver of the vehicle so that the visual noise has a subthreshold noise strength which is close to and smaller than a threshold strength, wherein above the threshold strength a light can be recognized and below the threshold strength a light cannot be recognized, and wherein the visual noise is determined to induce stochastic resonance in visual recognition of the driver and is superimposed on the visible light outputted from the lighting device;

a surrounding situation detector for detecting a situation surrounding the vehicle; and a controller for controlling a characteristic of delivering of the visual noise based on the detected situation, wherein the visual noise is random noise, wherein the surrounding situation detector recognizes a lane mark on a road in front of the vehicle and detects deviation of the vehicle from a center of a lane in which the vehicle is traveling, based on a relation between the detected mark and a current position of the vehicle; and wherein the controller causes the visual noise device to deliver the visual noise to the driver along a direction of the detected deviation.

6. The visual ability improvement supporting device according to claim 5, further comprising a storage device storing a correspondence of illuminance and optimum strength, wherein:

the surrounding situation detector detects the illuminance around the vehicle; and the controller sets based on the stored correspondence the noise strength corresponding to the detected illuminance.

7. The visual ability improvement supporting device according to claim 5, wherein:

the surrounding situation detector detects illuminance around the vehicle; and the controller causes, in a case that the detected illuminance is higher than a predetermined illuminance, the visual noise device to deliver the visual noise with hue of the visual noise changing; and the controller causes, in a case that the detected illuminance is lower than the predetermined illuminance, the visual noise device to deliver the visual noise with brightness of the visual noise changing.

8. The visual ability improvement supporting device according to claim 5, wherein:

the surrounding situation detector detects illuminance around the vehicle;

the controller causes, in a case that the detected illuminance is higher than a predetermined illuminance, the visual noise device to deliver the visual noise with one of hue and brightness of the visual noise changing within a first range; and the controller causes, in a case that the detected illuminance is lower than the predetermined illuminance, the visual noise device to deliver the visual noise with the one of the hue and the brightness of the visual noise changing within a second range wider than the first range.

9. A visual ability improvement supporting device for a vehicle, comprising:

a visual noise device including a lighting device provided in a passenger compartment of the vehicle for outputting light, the visual noise device generating a visual noise and delivering the visual noise to a driver of the vehicle so that the visual noise has a subthreshold noise strength which is close to and smaller than a threshold strength, wherein above the threshold strength a light can be recognized and below the threshold strength a light cannot be recognized, and wherein the visual noise is determined to induce stochastic resonance in visual recognition of the driver and is superimposed on the visible light outputted from the lighting device;

a surrounding situation detector for detecting a situation surrounding the vehicle; and a controller for controlling a characteristic of delivering of the visual noise based on the detected situation, wherein the visual noise is random noise, wherein the surrounding situation detector detects from a navigation device a road condition, which includes at least one of a shape of a road in front of the vehicle, a status of traffic jam in the road, a number of intersections in the road, and a type of the road; and wherein the controller causes the visual noise device to deliver the visual noise to the driver along a direction which is based on the detected road condition.

10. The visual ability improvement supporting device according to claim 9, further comprising
a storage device storing a correspondence of illuminance and optimum strength,
wherein:
the surrounding situation detector detects the illuminance around the vehicle; and
the controller sets based on the stored correspondence the noise strength corresponding to the detected illuminance.

11. The visual ability improvement supporting device according to claim 9, wherein:
the surrounding situation detector detects illuminance around the vehicle; and
the controller causes, in a case that the detected illuminance is higher than a predetermined illuminance, the visual noise device to deliver the visual noise with hue of the visual noise changing; and
the controller causes, in a case that the detected illuminance is lower than the predetermined illuminance, the visual noise device to deliver the visual noise with brightness of the visual noise changing.

12. The visual ability improvement supporting device according to claim 9, wherein:
the surrounding situation detector detects illuminance around the vehicle;
the controller causes, in a case that the detected illuminance is higher than a predetermined illuminance, the visual noise device to deliver the visual noise with one of hue and brightness of the visual noise changing within a first range; and
the controller causes, in a case that the detected illuminance is lower than the predetermined illuminance, the visual noise device to deliver the visual noise with the one of the hue and the brightness of the visual noise changing within a second range wider than the first range.

13. A visual ability improvement supporting device for a vehicle, comprising:
a visual noise device including a lighting device provided in a passenger compartment of the vehicle for outputting light, the visual noise device generating a visual noise and delivering the visual noise to a driver of the vehicle so that the visual noise has a subthreshold noise strength which is close to and smaller than a threshold strength, wherein above the threshold strength a light can be recognized and below the threshold strength a light cannot be recognized, and wherein the visual noise is determined to induce stochastic resonance in visual recognition of the driver and is superimposed on the visible light outputted from the lighting device;
a driver status detector for detecting a status of the driver; and
a controller for controlling a characteristic of delivering of the visual noise based on the detected status of the driver, wherein the visual noise is random noise,
wherein the driver status detector detects a line of sight of the driver and makes an determination that a target of the line of the sight changes from a close object to a distant object farther from the driver than the close object; and
wherein the controller causes, based on the determination, the visual noise device to deliver the visual noise to the driver along a direction of the line of the sight.

14. The visual ability improvement supporting device according to claim 13, further comprising:
a storage device for storing a correspondence between a distance and optimum strength,
wherein:
the visual noise device delivers the visual noise from a ceiling of a passenger compartment of the vehicle;
the driver status detector detects a distance between the ceiling and a head of the driver; and
the controller sets based on the stored correspondence the noise strength corresponding to the detected distance.

15. The visual ability improvement supporting device according to claim 13, wherein:
the driver status detector detects a distance between a head of the driver and a ceiling of a passenger compartment of a vehicle and makes a determination whether the driver is likely to be sleeping; and
the controller increases the noise strength of the visual noise to be delivered based on that the determination is affirmative.

16. The visual ability improvement supporting device according to claim 15, further comprising:
a stimulating device for giving an external stimulation to the driver in order to wake the driver up;
wherein the controller causes, based on that the determination is affirmative, the stimulating device to give the external stimulation to the driver.

17. The visual ability improvement supporting device according to claim 13, wherein:
the driver status detector detects a heartbeat of the driver and estimates an arousal level of the driver; and
the controller increases the noise strength of the visual noise to be delivered based on that the estimated arousal level has decreased.

18. The visual ability improvement supporting device according to claim 17, further comprising:
a stimulating device for giving an external stimulation to the driver in order to wake the driver up;
wherein the controller causes, based on that the estimated arousal level has decreased, the stimulating device to give the external stimulation to the driver.

19. A visual ability improvement supporting device for a vehicle, comprising:
a visual noise device including a lighting device provided in a passenger compartment of the vehicle for outputting light, the visual noise device generating a visual noise and delivering the visual noise to a driver of the vehicle so that the visual noise has a subthreshold noise strength which is close to and smaller than a threshold strength, wherein above the threshold strength a light can be recognized and below the threshold strength a light cannot be recognized, and wherein the visual noise is determined to induce stochastic resonance in visual recognition of the driver and is superimposed on the visible light outputted from the lighting device;
a driver status detector for detecting a status of the driver; and
a controller for controlling a characteristic of delivering of the visual noise based on the detected status of the driver,
wherein the visual noise is random noise,
wherein the driver status detector detects a line of sight of the driver; and
wherein the controller causes the visual noise device to deliver, along a direction within a central vision of the driver, the visual noise with hue of the visual noise mainly changing and to deliver, along a direction within a peripheral vision of the driver, the visual noise with brightness of the visual noise mainly changing.

20. The visual ability improvement supporting device according to claim 19, further comprising:
a storage device for storing a correspondence between a distance and optimum strength,
wherein:
the visual noise device delivers the visual noise from a ceiling of a passenger compartment of the vehicle;
the driver status detector detects a distance between the ceiling and a head of the driver; and
the controller sets based on the stored correspondence the noise strength corresponding to the detected distance.

21. The visual ability improvement supporting device according to claim 19, wherein:
the driver status detector detects a distance between a head of the driver and a ceiling of a passenger compartment of a vehicle and makes a determination whether the driver is likely to be sleeping; and
the controller increases the noise strength of the visual noise to be delivered based on that the determination is affirmative.

22. The visual ability improvement supporting device according to claim 19, wherein:
the driver status detector detects a heartbeat of the driver and estimates an arousal level of the driver; and
the controller increases the noise strength of the visual noise to be delivered based on that the estimated arousal level has decreased.

* * * * *